US011998905B2

(12) United States Patent
Döbele

(10) Patent No.: US 11,998,905 B2
(45) Date of Patent: Jun. 4, 2024

(54) HANDLE FOR A PIPETTE, SET COMPRISING AT LEAST TWO HANDLES, AND PIPETTE

(71) Applicant: IKA-Werke Gmbh & Co. KG, Staufen (DE)

(72) Inventor: Philip Döbele, Emmendingen (DE)

(73) Assignee: IKA—Werke Gmbh & Co. KG, Staufen (DE)

( * ) Notice: Subject to any disclaimer, the term of this patent is extended or adjusted under 35 U.S.C. 154(b) by 908 days.

(21) Appl. No.: 16/978,993

(22) PCT Filed: Mar. 9, 2018

(86) PCT No.: PCT/EP2018/055917

§ 371 (c)(1),
(2) Date: Sep. 8, 2020

(87) PCT Pub. No.: WO2019/170251

PCT Pub. Date: Sep. 12, 2019

(65) Prior Publication Data

US 2020/0406250 A1 Dec. 31, 2020

(51) Int. Cl.
*B01L 1/00* (2006.01)
*B01L 3/02* (2006.01)

(52) U.S. Cl.
CPC ............ *B01L 3/021* (2013.01); *B01L 3/0286* (2013.01); *B01L 2200/14* (2013.01)

(58) Field of Classification Search
None
See application file for complete search history.

(56) References Cited

U.S. PATENT DOCUMENTS

2008/0223108 A1 9/2008 Kobayashi et al.
2010/0011889 A1 1/2010 Lemmo

FOREIGN PATENT DOCUMENTS

WO 2014178101 A1 11/2014
WO WO 2014/178101 A1 * 11/2014
WO 2018086741 A1 5/2018

OTHER PUBLICATIONS

International Search Report from PCT International Application No. PCT/EP2018/055917, dated Jun. 26, 2018.
International Preliminary Report on Patentability from PCT International Application No. PCT/EP2018/055917, dated Sep. 15, 2020.

* cited by examiner

*Primary Examiner* — Jyoti Nagpaul
(74) *Attorney, Agent, or Firm* — Budzyn IP Law, LLC

(57) ABSTRACT

The invention is concerned with improvements in the technical field of pipettes. For this purpose, a pipette (1) with a base body (2) and a handle (3) is proposed, wherein a thermal insulation (5) is formed or arranged between the handle (3) and the base body (2) of the pipette (1) (see FIG. 1).

20 Claims, 4 Drawing Sheets

HANDLE FOR A PIPETTE, SET COMPRISING AT LEAST TWO HANDLES, AND PIPETTE

FIELD OF THE INVENTION

The invention relates to a handle for a pipette, a set comprising at least two handles and a pipette with a base body and with a handle that can be or is connected to the base body.

BACKGROUND OF THE INVENTION

Such pipettes are known from practice and the prior art in a wide variety of embodiments.

They are mainly used to dose and dispense small or even the smallest amounts of fluid very precisely. Such pipettes are mainly used in laboratories.

It is necessary that these pipettes permit the most precise and also repeatable dosing of defined fluid volumes. Particularly when pipettes are used in laboratory operations, it is necessary that pre-set fluid volumes that are to be dispensed with such pipettes can be kept as constant as possible, even when the boundary or ambient conditions change. This is not always possible with the pipettes previously known from the prior art and practice, so that a readjustment or recalibration of the pipettes may be necessary comparatively often, depending on the prevailing ambient conditions.

SUMMARY OF THE INVENTION

The object of the invention is therefore to reduce or even avoid the disadvantages outlined above when using pipettes of the type mentioned at the beginning and to simplify the handling of pipettes.

To solve this problem, a handle for a pipette is first proposed which has the means and features of the independent claim directed to such a handle. In particular, a handle of the type mentioned at the beginning is proposed to achieve the object, which has a thermal insulation for a hand contact surface of the handle. The thermal insulation is arranged and/or formed in such a way that the hand contact surface is thermally insulated from the base body when the handle is in the attachment position on a base body of a pipette.

As a disturbance variable that can negatively influence the constant dosing accuracy of such pipettes, among other things, a heating of their base body was recognised, which can be caused by the body heat given off by a user's hand. When examining the problem of fluctuating dosing accuracies more precisely, a relevant disturbance variable has emerged when a user is using the pipette from his hand via the handle on the base body of the pipette, in which mechanical and/or electrical and/or electronic components of the pipette are arranged. Such components or elements can be, for example, electrical, electronic and/or mechanical components and/or elements of a dosing and/or fluid delivery mechanism of a pipette. When heated, these components and/or elements can expand, for example, which can have a negative effect on the dosing accuracy of the pipette.

With the aid of the previously described thermal insulation for the hand contact surface of the handle, the heat transfer from the hand of a user to the base body of a pipette equipped with the handle can be reduced or even completely avoided. This leads to better dosing accuracy even under changing conditions and thus to a simplification of the handling of the pipette overall. Above all, it was observed that a calibration and adjustment of a pipette equipped with a handle according to the invention has to be carried out less frequently because of the thermal insulation.

At this point it should be mentioned that the hand contact surface of the handle is the surface on which a hand of a user rests when using the handle or a pipette equipped with such a handle.

The thermal insulation of the handle can be arranged and/or formed between the hand contact surface and a mounting surface of the handle with which the handle is mounted on the base body in its attachment position.

The handle can also have a grip part, on the inner side of which, in the attachment position of the handle, facing a base body of a pipette, the thermal insulation for the hand contact surface is arranged or formed. In this way, the thermal insulation can be well protected when the handle is in the attachment position between the grip part and the base body of the pipette.

It can also be advantageous if the thermal insulation comprises a thermally insulating structure, a thermally insulating material layer and/or a thermally insulating air layer. It is also possible that the thermal insulation consists of a thermally insulating structure, a thermally insulating material layer and/or a thermally insulating air layer.

The previously mentioned thermally insulating structure, which can comprise the thermal insulation or of which the thermal insulation can consist at least partially, can preferably protrude from an inner side of the grip part and/or, when the handle is arranged on a base body of a pipette in the position of use, protrude from the inner side of the grip part in the direction of the base body. The previously mentioned thermally insulating structure can for example have at least one spacer protruding from the inner side of the grip part. It is also possible that the thermally insulating structure comprises or is at least one rib protruding from the inner side and/or a ribbing protruding from the inner side and/or a honeycomb structure protruding from the inner side.

With the help of the spacer, the at least one protruding rib, the protruding ribbing and/or the protruding honeycomb structure, the distance between the hand contact surface of the handle, which the user makes direct contact with when using the pipette, and the base body can be increased. Due to the thermally insulating structure, it is also possible that an air cushion and/or an air layer and/or an air gap is formed between the handle and the base body of the pipette, which additionally supports the thermally insulating effect of the thermal insulation of the handle.

It can also be expedient if the thermally insulating structure makes direct contact with the base body of a pipette equipped with the handle when the handle is in the position of use. In this case, an inner side of the grip part, for example the previously mentioned inner side of the grip part surrounding the thermally insulating structure, can be spaced apart from a front side of the thermally insulating structure facing the base body when the grip part is in the position of use. In this way, the contact surface or mounting surface between the base body and the handle, in particular the inner side of the grip part of the handle, from which the thermally insulating structure can protrude, can be minimised. This can promote a low heat transfer.

When using a ribbing at least as part of a thermally insulating structure, it can be provided that the ribbing comprises at least two parallel and/or at least two mutually transversely oriented ribs, which protrude from the inner side of the grip part when the handle is in the attachment position on a base body of a pipette in the direction of the base body. Such a ribbing can be produced comparatively easily; possibly even made of the same material as the grip part of the handle.

The thermal insulation, in particular the previously mentioned thermally insulating structure or the thermally insulating material layer, and the grip part of the handle can form a materially homogeneous, monolithic unit. For example, it is possible that a spacer, which can be part of the thermally insulating structure and/or a rib, which can also be part of a thermally insulating structure of the handle, is/are integrally connected to the grip part.

The thermal insulation, in particular the thermally insulating structure and/or the thermally insulating material layer, of the handle can have at least one chamber and/or receptacle. At least part of a thermally insulating material layer and/or a thermally insulating air layer can be arranged in this at least one chamber and/or receptacle. The at least one receptacle and/or chamber can be delimited or defined by at least two ribs, a ribbing and/or honeycomb structure of the thermally insulating structure.

Furthermore, it is possible that at least one chamber and/or receptacle of the thermal insulation is formed to be open on its side facing a base body of a pipette equipped with the handle. In this way, the at least one chamber and/or receptacle can be manufactured particularly easily, in particular by injection moulding. In addition, the at least one chamber and/or receptacle formed open can be filled with a thermally insulating material by a user if necessary. This, for example, if the thermally insulating effect of the thermal insulation should be changed.

The thermal insulation, in particular the previously mentioned thermally insulating material layer and/or the thermally insulating structure, can consist of a foam, of rubber and/or of foamed plastic. It is also possible that the thermal insulation, in particular the thermally insulating material layer and/or the thermally insulating structure, comprises foam, rubber and/or foamed plastic. Polystyrene or Styrofoam, for example, are used as suitable foamed plastic.

The thermally insulating material layer can itself have air inclusions, which can promote the thermal insulation capacity of the thermally insulating material layer.

The handle can be hook-shaped or have a hook at its upper end in the attachment position. In this way, a pipette that is equipped with the previously mentioned handle can be handled particularly comfortably and safely.

It is also possible that the handle is formed as an interchangeable handle that can be reversibly connected to a base body of a pipette.

It is thus possible to remove the handle from the base body of a pipette if necessary and preferably without the use of tools. For example, to be able to clean it particularly carefully or to exchange a damaged handle.

To achieve the object mentioned at the beginning, a set according to claim 11 comprising at least two handles according to any one of claims 1 to 10 is also proposed, wherein the at least two handles have different dimensions and are thus adapted to different hand sizes and/or have different thermal insulation. With the set described above it is possible to adapt a pipette to different hand sizes by simply exchanging the handles and to enable the desired thermal insulation between the handle and the base body of the pipette for different users with different hand sizes. Thus, ultimately, the use of at least one handle according to any one of claims 1 to 10 for adapting a pipette to different hand sizes is also proposed.

Due to the different thermal insulation of the at least two handles, the handles can, on the one hand, be adapted at least indirectly to different hand sizes. On the other hand, it is possible to have handles with different thermal insulation and thus with different insulation effects for use under different environmental conditions.

The aforementioned object is also achieved with a pipette of the type mentioned at the beginning, which has the means and features of the independent claim directed to a pipette. In order to achieve the object, it is therefore proposed, particularly in the case of the pipette mentioned at the beginning, that thermal insulation be arranged or formed between a hand contact surface of the handle and the base body of the pipette. In this way, heat transfer from the handle to the base body of the pipette caused by hand contact can be reduced or even avoided at least in the region of the thermally insulated hand contact surface of the handle.

It can be advantageous if the thermal insulation is arranged or formed between the base body and a grip part of the handle. In this way, the thermal insulation can be easily protected from external influences.

The thermal insulation can be configured to be particularly effective if it comprises or is a thermally insulating structure and/or a thermally insulating material layer and/or a thermally insulating air layer.

The thermally insulating structure can comprise or be at least one spacer protruding from an outer side of the base body, at least one rib protruding from an outer side of the base body and/or a ribbing protruding from an outer side of the base body and/or a honeycomb structure protruding from an outer side of the base body. The thermally insulating structure can increase a distance between the handle and the base body of the pipette and thus make difficult or prevent heat transfer from the handle to the base body when the pipette is used. The thermally insulating structure can also promote the formation of an air gap, air cushion and/or air inclusion between the base body and the handle of the pipette, which can also contribute to the thermally insulating effect of the thermal insulation.

The previously mentioned ribbing can comprise at least two parallel and/or at least two mutually transversely oriented ribs, which protrude from the outer side of the base body.

The thermal insulation, in particular one or the thermally insulating structure or one or the thermally insulating material layer, and the base body of the pipette can form a materially homogeneous, monolithic unit. In this way it is possible to produce at least parts of the thermal insulation in one process step together with the base body of the pipette. If the base body of the pipette, which can simultaneously represent at least part of a housing of the pipette, consists of plastic, it is possible, for example, to produce the possibly complex structures of the thermal insulation and the base body together in an injection moulding process.

The thermal insulation, in particular the thermally insulating structure or also the thermally insulating material layer, can have at least one chamber and/or receptacle. At least part of the thermally insulating material layer and/or the thermally insulating air layer can be arranged in this at least one chamber and/or receptacle of the thermally insulating structure of the pipette. The at least one receptacle and/or chamber of the thermal insulation, in particular of the thermally insulating structure, can be delimited by at least two ribs, a ribbing and/or a honeycomb structure. It is also possible for the thermally insulating material layer to have at least one chamber. This at least one chamber can contain at least part of a thermally insulating air layer. It is also possible that the at least one chamber and/or receptacle is formed to be open on at least one side. This can facilitate the introduction of thermally insulating material into the chamber and/or receptacle.

The thermal insulation, in particular the thermally insulating material layer and/or the thermally insulating structure, can consist of a foam, of rubber and/or of foamed plastic. It is also possible that the thermal insulation, in particular the thermally insulating material layer and/or the thermally insulating structure, comprises foam, rubber and/or foamed plastic. For example, polystyrene or Styrofoam can be used as foamed plastic.

In addition, the handle of the previously mentioned pipette can be a handle according to any one of claims 1 to 10. In this way, the thermal insulation can be integrated into the handle of the pipette. This favours the handling of the pipette and, in particular, the thermal insulation. It is also possible for the pipette to be assigned a set which comprises at least two such handles.

In this way, the pipette with the at least two different handles contained in the set of the type claimed in the previous description and in the corresponding claims can be adapted particularly easily to different hand sizes and/or to different boundary conditions.

BRIEF DESCRIPTION OF THE DRAWINGS

Exemplary embodiments of the invention are described in more detail below with reference to the drawings. The invention is not restricted to the exemplary embodiments shown. Further exemplary embodiments of the invention result from combination of the features of individual or multiple claims with one another and/or in combination of individual or multiple features of the exemplary embodiments. They show in partly highly schematic representation:

DETAILED DESCRIPTION OF THE INVENTION

Figure 1:
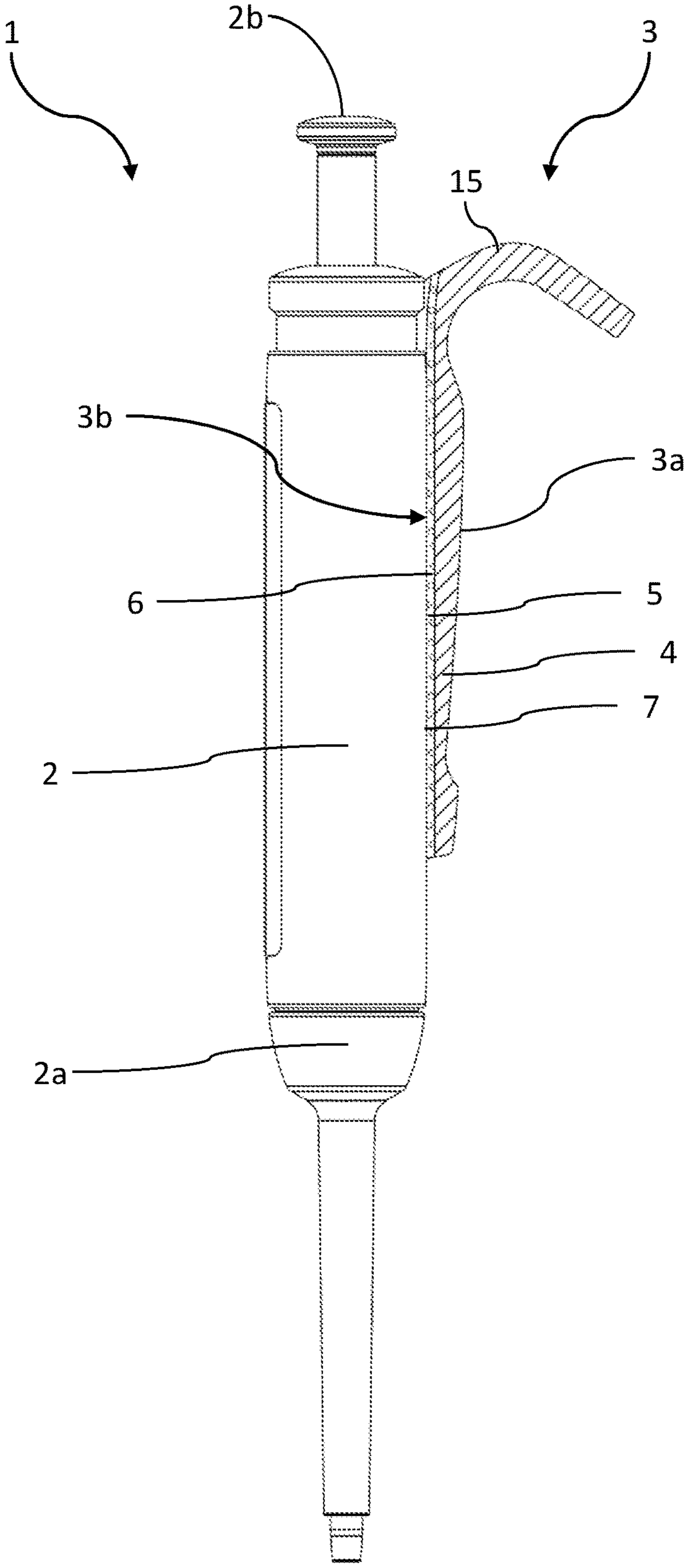
FIG. 1 shows a side view of a pipette comprising a base body, a fluid dispensing unit connected to the base body and a handle connected to the base body, wherein thermal insulation for a hand contact surface of the handle is arranged or formed between the handle and the base body of the pipette.
Figure 2:
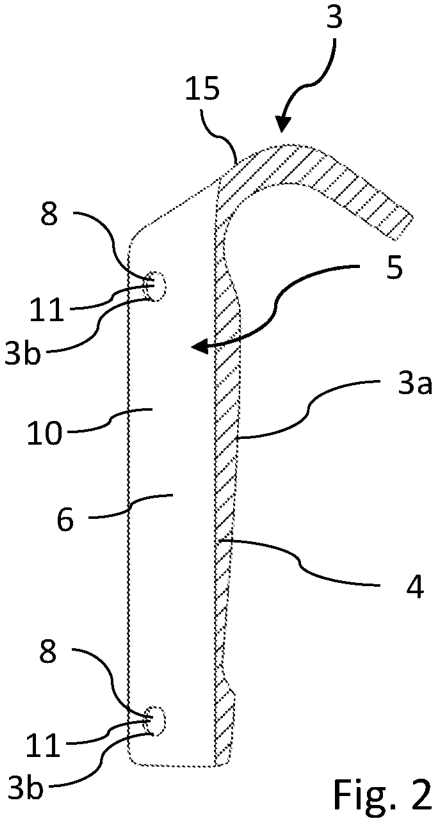
FIG. 2 to FIG. 13 show different embodiments of handles, each of which has thermal insulation for thermal decoupling of the handle from the base body of the pipette, wherein the thermal insulation of the different handles comprises or consists of thermally insulating structures and/or thermally insulating material layers.
Figure 4:
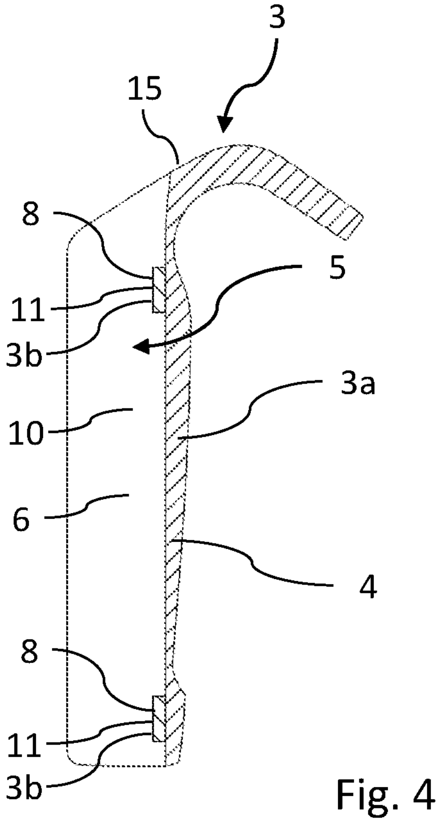
Figure 3:
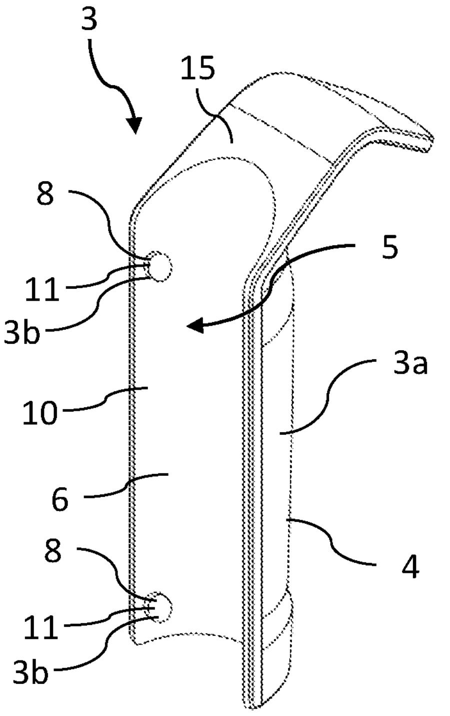
Figure 5:
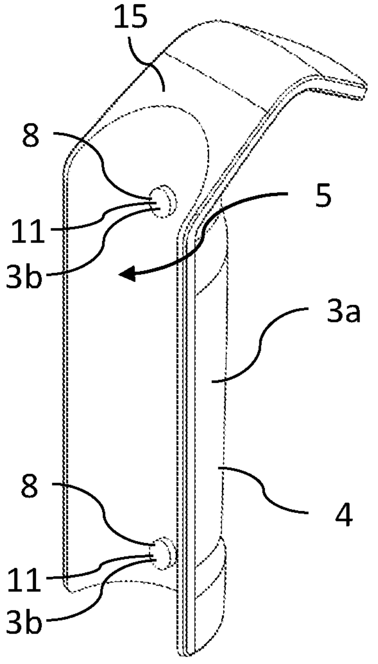
Figure 6:
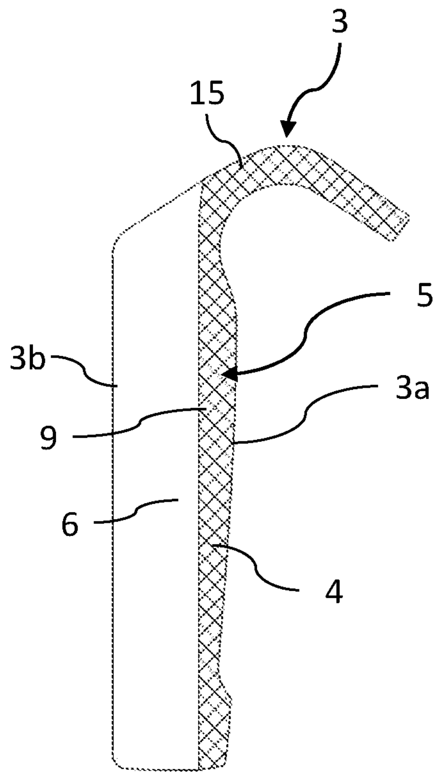
Figure 8:
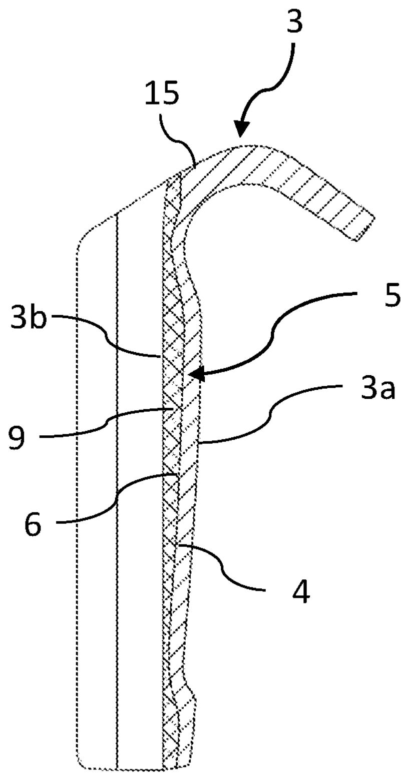
Figure 7:
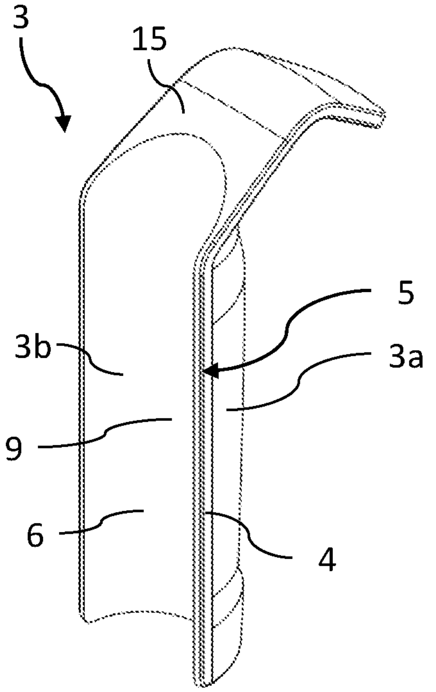
Figure 9:
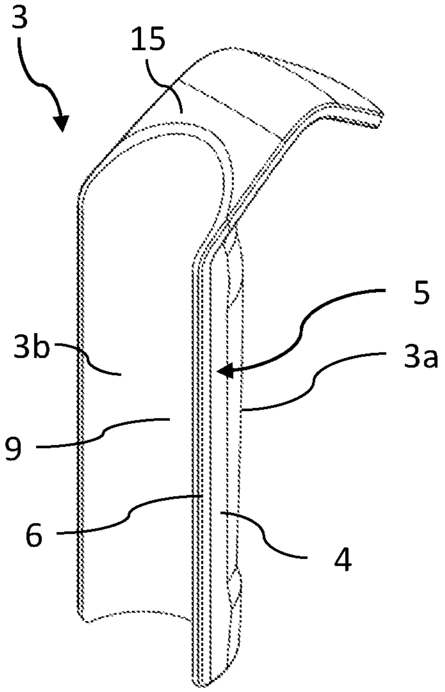
Figure 10:
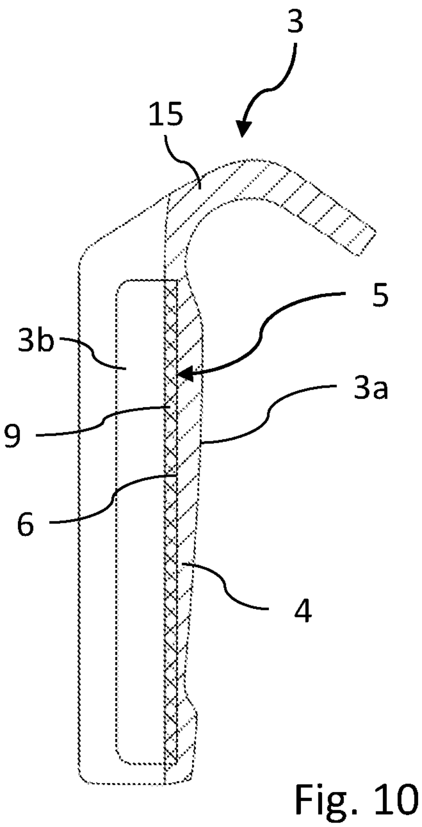

FIG. 1 shows a pipette designated as a whole by 1, which is formed as a hand-operated pipette 1. The pipette 1 illustrated in FIG. 1 comprises a base body 2 and a handle 3 that can be connected to the base body 2 and that is connected in FIG. 1. A fluid dispensing unit 2*a* is also arranged on the base body 2 of the pipette 1, via which pre-set quantities of fluid can be dispensed when a pipetting button 2*b* at the upper end of the pipette 1 is actuated.

According to FIG. 1, a thermal insulation 5 is arranged or formed between the base body 2 of the pipette 1 and a hand contact surface 3*a* of the handle 3 on a grip part 4 of the handle 3. The grip part 4 of the handle 3 is formed as a grip shell, just as in the case of the handles 3 which are shown in FIGS. 2 to 13 and are basically also suitable for being attached to the base body 2 of the pipette 1. The shell-shaped grip part 4 has a concave inner side 6, which is adapted to a convex or curved outer side 7 of the base body 2 and encloses the base body 2 at least in some regions.

Thus, each handle 3 and ultimately also the pipette 1 equipped with it has thermal insulation 5 for its hand contact surface 3*a*, which reduces or even prevents the heat transfer when the pipette 1 is used from the handle 3 to the base body 2 of the pipette 1. This is important insofar as thermally sensitive components of a dosing mechanism and a fluid dispensing mechanism of the pipette are arranged in particular in the base body 2 of the pipette 1. It was surprisingly found that a change in temperature of these components can negatively affect the dosing accuracy of the pipette. The dosing accuracy of the pipette 1 can be improved with the aid of the thermal insulation 5, but at least kept constant in certain regions.

Depending on the embodiment of the thermal insulation 5, it can comprise or be a thermally insulating structure 8 and/or a thermally insulating material layer 9 and/or a thermally insulating air layer 10. Examples of thermally insulating structures 8 can be seen, for example, from the handles 3, which are shown in FIGS. 2 to 5 as well as 12 and 13. In addition to the thermally insulating structures 8, the thermal insulations 5 of these handles 3 also comprise thermally insulating air layers 10 which are formed between the thermally insulating structures 8 when the handles 3 are in the attachment position on a base body 2 of a pipette 1.

Examples of thermally insulating material layers 9 can be seen in the handles 3 according to FIGS. 6 to 10. Thermal insulations 5, regardless of the form in which they are present, can, however, also be arranged or formed on a base body 2 of a pipette 1, as is illustrated, for example, in FIG. 1.

FIG. 1 initially shows a possible exemplary embodiment of a thermal insulation 5, which is formed or arranged between the base body 2 and the grip part 4 of a handle 3 and thus between the base body 2 and the hand contact surface 3*a* of the handle 3, only in a highly schematic manner.

At this point it should be mentioned that, in principle, each of the handles 3 shown in FIGS. 2 to 13 is suitable for being arranged on the base body 2 of the pipette 1 illustrated in FIG. 1.

It is possible that the thermally insulating structure 8 is not arranged or formed on the handle 3, but on the outer side 7 of the base body 2 of the pipette 1. It can be provided here that the thermally insulating structure 8 comprises or is at least one spacer protruding from the outer side 7 of the base body 2, at least one rib protruding from the outer side 7 of the base body 2, a ribbing protruding from the outer side 7 of the base body 2 and/or a honeycomb structure protruding from the outer side 7 of the base body 2. The ribbing protruding from the base body 2 of the pipette 1 can comprise at least two parallel and/or two mutually transversely oriented ribs, which in turn protrude from the outer side 7 of the base body 2.

The thermal insulation 5 and the base body 2 of the pipette 1 can form a materially homogeneous, monolithic unit, that is to say they can be connected to one another in one piece. In this way it is possible to manufacture the base body 2 of the pipette 1 and the thermal insulation 5 of the pipette 1 in a common process step.

The thermally insulating structure 5 can have chambers and/or receptacles in which at least a part of the thermally insulating material layer 9 and/or the thermally insulating air layer 10 is arranged. The receptacles or chambers can be delimited and/or defined by at least two ribs, a ribbing and/or a honeycomb structure.

The thermally insulating material layer 9 can consist of a foam, rubber or foamed plastic, such as polystyrene or Styrofoam, or at least comprise such materials. Depending on the exemplary embodiment of the pipette 1 or the handle 3, the thermally insulating material layer 9 is either arranged on the handle 3 or on the base body 2 of the pipette 1. Examples of thermally insulating material layers 9 which are arranged on an inner side 6 of a handle 3 are illustrated in FIGS. 2 to 9. In one embodiment of the pipette 1, the handle 3 is a handle 3, such as is illustrated, for example, in FIGS. 2 to 13. Each of the handles 3 shown in FIGS. 2 to 13 can be used on the base body 2 of the pipette 1 shown in FIG. 1.

FIGS. 2 to 13 now show handles each designated by 3. Each of the handles 3 has thermal insulation 5 for a hand contact surface 3*a*. Each of the thermal insulations 5 is arranged and/or formed such that the hand contact surface 3*a*, which is backed by the thermal insulation 5, is thermally insulated from the base body 2 when the handle 3 is in the attachment position of the handle 3 on a base body 2 of a pipette 1. In each handle 3, the thermal insulation 5 is arranged and/or formed between the hand contact surface 3*a* and a mounting surface 3*b* of the handle 3. With this mounting surface 3*b*, each of the handles 3 rests in the attachment position on a base body 2 of a pipette 1.

Each of the handles 3 has a grip part 4. In some handles 3, the grip part 4 is provided with thermal insulation 5 for the hand contact surface 3*a* of the handle 3 on its inner side 6 facing a base body 2 of a pipette 1 in the attachment position. As thermal insulations 5, for example, thermally insulating structures 8, thermally insulating material layers 9 and/or thermally insulating air layers 10 come into consideration.

The handles 3 can be provided with different thermally insulating structures 8. The handles 3 illustrated in FIGS. 2 to 5 have spacers 11 protruding from the inner sides 6 of their grip parts 4. These spacers 11 ensure that the inner side 6 of the respective grip part 4 of the respective handle 3 does not rest fully on the outer side 7 of the base body 2 of the pipette. The contact surface 3*b* of the handle 3 is thus substantially reduced to the surface at the free ends of the spacers 11 and/or thus to the front of the spacers 11. The spacers 11 enable the formation of a thermally insulating air layer 10 between the inner side 6 of the respective grip part 4 and the outer side 7 of the base body 2 of the pipette 1. The spacers 11 thus promote the thermal insulation or decoupling of the hand contact surface 3*a* of the handle 3 from the base body 2 of the pipette 1.

Figure 12:
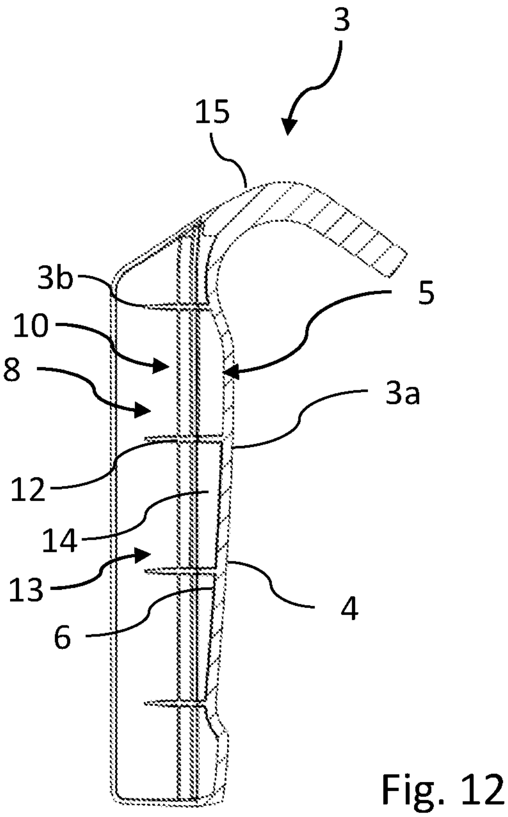
Figure 11:
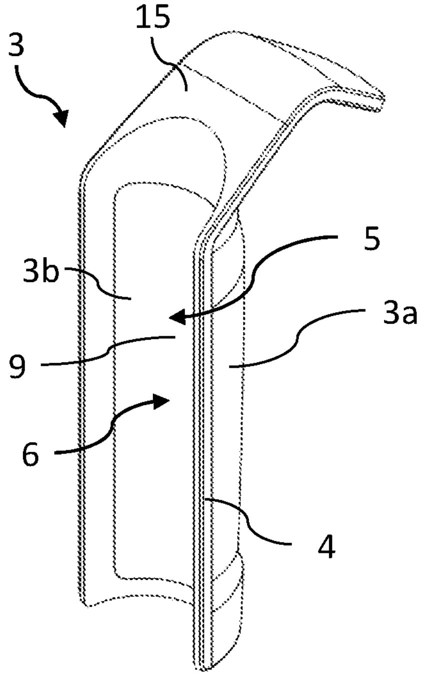
Figure 13:
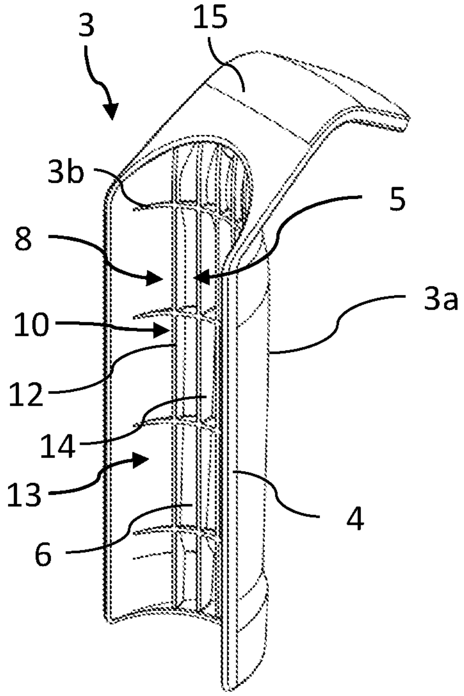

In the exemplary embodiment of a handle 3 shown in FIGS. 12 and 13, this has on the inner side 6 of its grip part 4 a ribbing 13 formed from a plurality of individual ribs 12 and protruding. Similar to the aforementioned spacers 11, the ribbing 13 also serves to avoid full surface mounting of the inner side 6 of the grip part 4 on the outer side 7 of the base body 2 of the pipette 1 and to favour a formation of a thermally insulating air cushion or a thermally insulating air layer 10 between the base body 2 and the hand contact surface 3*a* or the grip part 4 of the handle 3. According to FIGS. 12 and 13, the ribs 13 are formed from a plurality of parallel ribs 12 and a plurality of ribs 12 aligned at right angles to one another, which protrude from the inner side 6 of the grip part 4 in the direction of the base body 2. The mounting surface 3*b* of this handle 3 is thus substantially reduced to the surface at the free ends of the individual ribs 12.

The thermally insulating structures 8 of the handles 3, as shown in FIGS. 2 to 5 and FIGS. 12 and 13, together with the grip part 4 form a homogeneous, monolithic unit, that is, they are made of the same material. In the embodiment of a handle 3 according to FIG. 6, it should be mentioned that the thermally insulating material layer 9 serving as thermal insulation 5 and the grip part 4 likewise form a materially homogeneous, monolithic unit. Here, the grip part 4 and also the thermally insulating layer 9 are made from one and the same material. In other words, this means that the handle 3 shown in FIGS. 6 and 7 consists entirely of a thermally insulating material, such as synthetic foam.

In particular in the embodiment of a handle 3 according to FIGS. 12 and 13, it can be seen that the thermally insulating structure 8, which is formed here by the ribbing 13 already described above, has chambers 14 which can also be referred to as receptacles. At least part of a thermally insulating material layer 9 can be arranged in these chambers 14 or receptacles as thermal insulation 5, or, as is the case here, the thermally insulating air layer 10. The receptacles or chambers 14 are laterally delimited by at least two ribs 12 of the ribbing 13 and are thus defined by them. It is also noticeable that the chambers 14 are formed to be open on their sides facing the base body 2 of a pipette 1 in the position of use. It is thus possible to fill the chambers 14 relatively easily with a thermally insulating material, if necessary, in order to change the thermally insulating properties of the thermal insulation 5, preferably to improve them.

All of the figures show that the handle 3 shown in each case is designed as a hook at its upper end 15 in the attachment position. The hook-shaped design of the handle 3 at its upper end 15 allows easier and, above all, safer handling of a pipette 1 equipped with the handle 3. Each of the handles 3 illustrated in the figures is also designed as an interchangeable handle. It is thus possible to reversibly connect each of the handles 3 illustrated in the figures to the base body 2 of the pipette 1 shown in FIG. 1 and thus to exchange the handles 3 with one another if necessary.

Sets can be formed from the handles 3 shown in the figures. Each of the sets comprises at least two of the handles 3, which then preferably have different dimensions and are thus adapted to different hand sizes. Handles 3 that have different thermal insulations 5 can also be combined within a set. Thus, a pipette 1 can be easily adapted to different environmental conditions by means of handles 3 with different thermal insulations 5.

The invention is concerned with improvements in the technical field of pipettes, in particular hand-operated pipettes. For this purpose, a pipette 1 with a base body 2 and a handle 3 is proposed in particular, wherein a thermal insulation 5 is formed or arranged between the handle 3 and the base body 2 of the pipette 1.

What is claimed is:

1. A handle (3) for a pipette (1) having a base body (2), wherein the handle (3) has: i. a grip part (4) having a convex outer side (7) defining a a hand contact surface (3*a*) and a concave inner side (6) which faces the base body (2) of the pipette (1) with the handle (3) mounted to the base body (2), the grip part (4) being elongated to extend along a longitudinal axis between first and second axial ends, the longitudinal axis not intersecting the inner side (6), and ii. a thermal insulation (5) including a first thermally insulating structure (8) defined on the inner side (6) adjacent the first axial end and a second thermally insulating structure (8) defined on the inner side (6) adjacent the second axial end, an air layer being defined: i. between the first thermally insulating structure (8) and the first axial end to extend between the inner side (6) and the base body (2) of the pipette (1) with the handle (3) mounted to the base body (2), and, ii. between the second thermally insulating structure (8) and the second axial end to extend between the inner side (6) and the base body (2) of the pipette (1) with the handle mounted to the base body (3), wherein the thermal insulation (5) thermally insulates the hand contact surface (3*a*) from the base body (2) with the handle (3) mounted on the base body (2) of the pipette (1).

2. The handle (3) according to claim 1, wherein the first thermally insulating structure (8) protrudes from the inner side (6) of the grip part (4).

3. The handle (3) according to claim 2, wherein the first thermally insulating structure (8) includes at least one spacer (5).

4. The handle (3) according to claim 2, wherein the first thermally insulating structure (8) includes at least one rib (12).

5. The handle (3) according to claim 1, wherein the first thermally insulating structure (8) includes ribbing (13).

6. The handle (3) according to claim 5, wherein the ribbing (13) is formed by a plurality of intersecting ribs (12).

7. The handle (3) according to claim 6, wherein a plurality of chambers (14) are defined by the plurality of intersecting ribs (12), the plurality of chambers (14) being open in facing the base body (2) of the pipette (1), with the handle (3) mounted in the attachment position.

8. The handle (3) according to claim 1, wherein the thermal insulation (5) and the grip part (4) form a materially homogeneous, monolithic unit.

9. The handle (3) according to claim 1, wherein the thermal insulation (5) includes a thermally insulating material layer (9).

10. The handle (3) according to claim 9, wherein the thermally insulating material layer (9) includes one or more of: foam, rubber, and foamed plastic.

11. The handle (3) according to claim 1, wherein the handle (3) further includes a hook, extending from the first axial end, to allow for reversible mounting in the attachment position on the base body (2) of the pipette (1).

12. A combination comprising:

a pipette (1) with a base body (2); and a handle (3), formed according to claim 1, which is mountable to the base body (2).

13. The combination according to claim 12, wherein the first thermally insulating structure (8) protrudes from an outer side (7) of the base body (2).

14. The combination according to claim 13, wherein the first thermally insulating element (8) is defined on ribbing.

15. The combination according to claim 14, wherein the ribbing (13) is formed by a plurality of intersecting ribs (12).

16. The combination according to claim 15, wherein a plurality of chambers (14) are defined by the plurality of intersecting ribs (12), the plurality of chambers (14) being open in facing the handle (3), with the handle (3) mounted in the attachment position.

17. The combination according to claim 13, wherein the at least one thermally insulating structure (8) includes at least one spacer (5).

18. The combination according to claim 13, wherein the at least one thermally insulating structure (8) includes at least one rib (12).

19. The combination according to claim 12, wherein the thermal insulation (5) includes a thermally insulating material layer (9).

20. The combination according to claim 19, wherein the thermally insulating material layer (9) includes one or more of: foam, rubber, and foamed plastic.

* * * * *